Aug. 22, 1950  R. SAULNIER  2,520,017
SPRING SYSTEM
Filed Oct. 6, 1945  13 Sheets-Sheet 2

Inventor.
Raymond Saulnier
By Brown + Okward
Attorneys

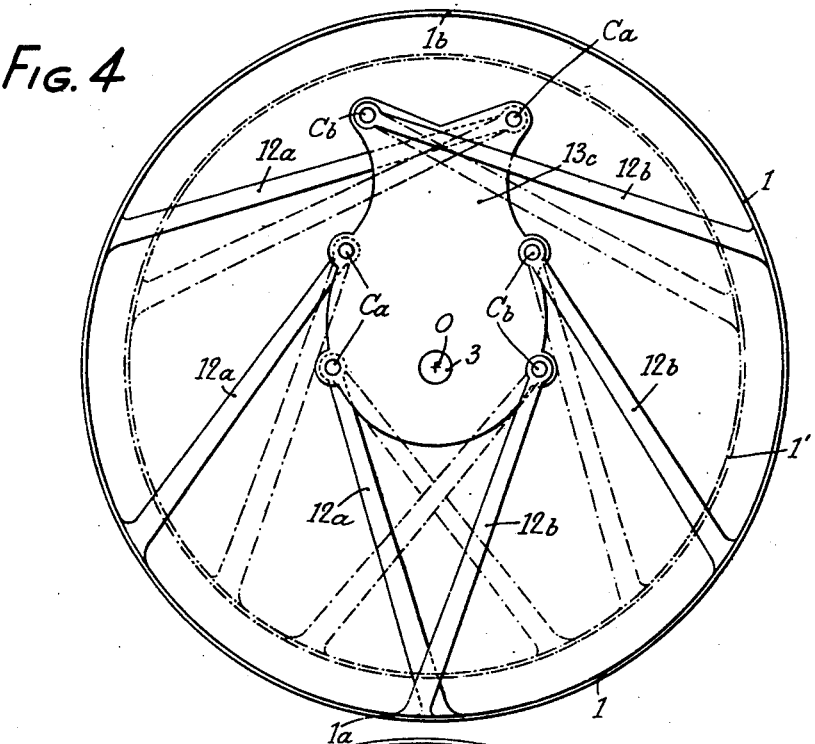

Aug. 22, 1950 — R. SAULNIER — 2,520,017
SPRING SYSTEM
Filed Oct. 6, 1945 — 13 Sheets-Sheet 4
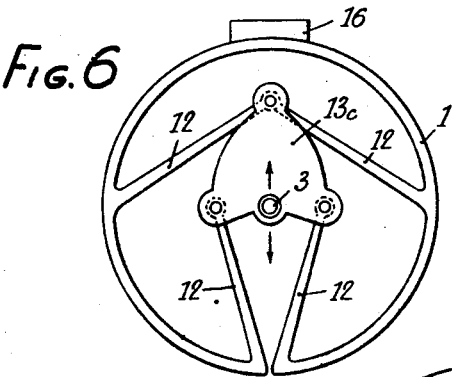
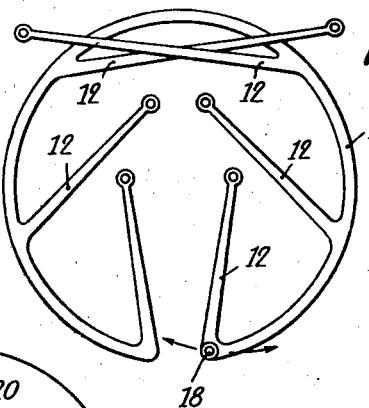
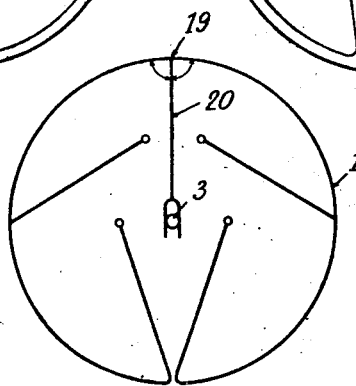
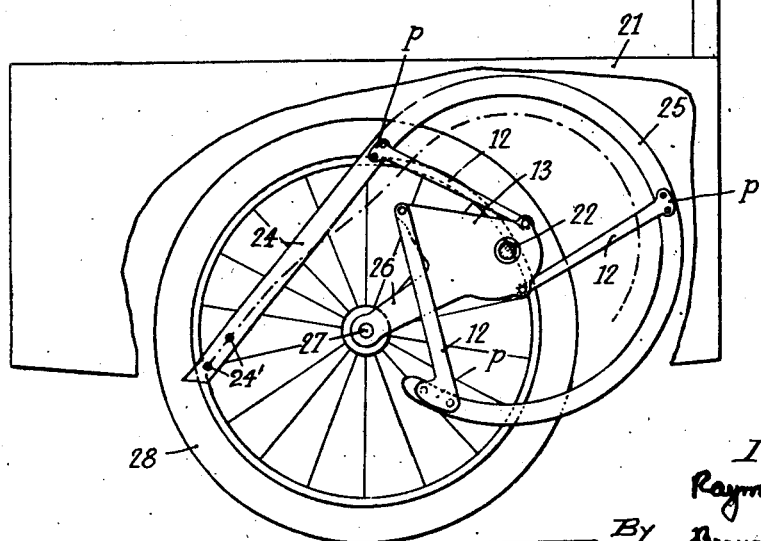
Inventor:
Raymond Saulnier
By Brown & Deward
Attorneys

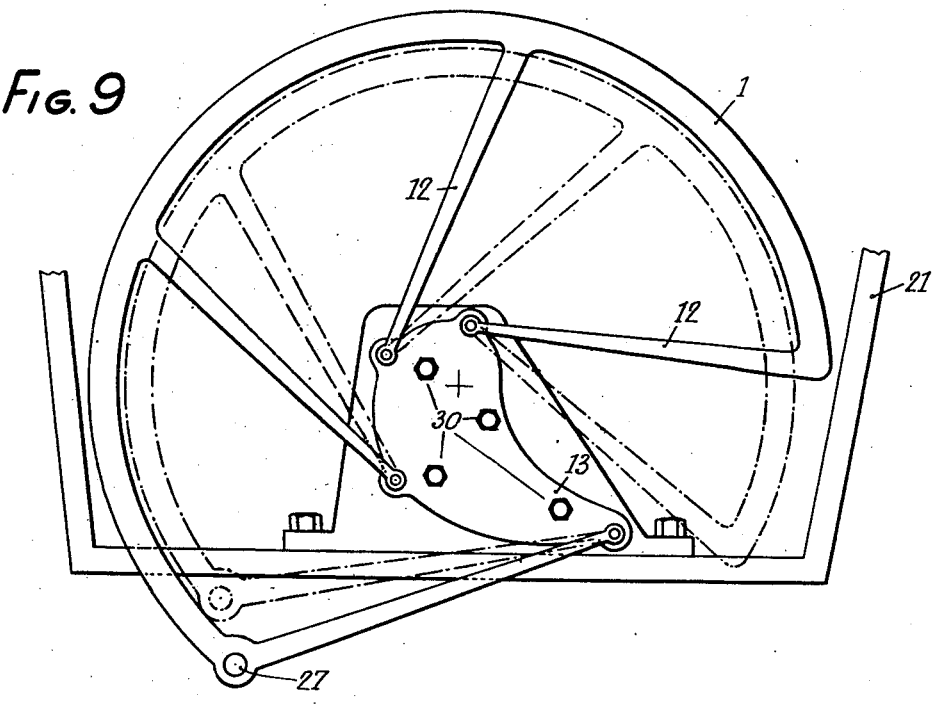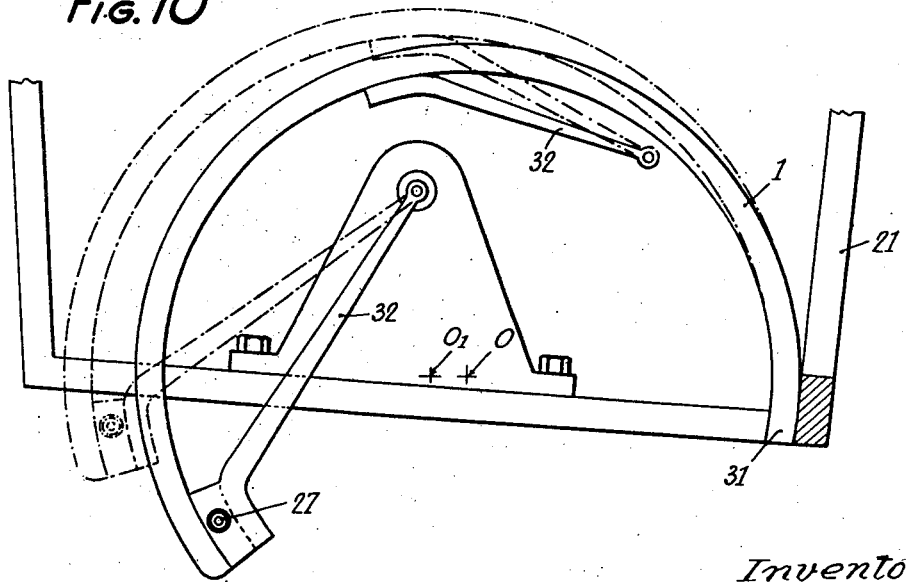

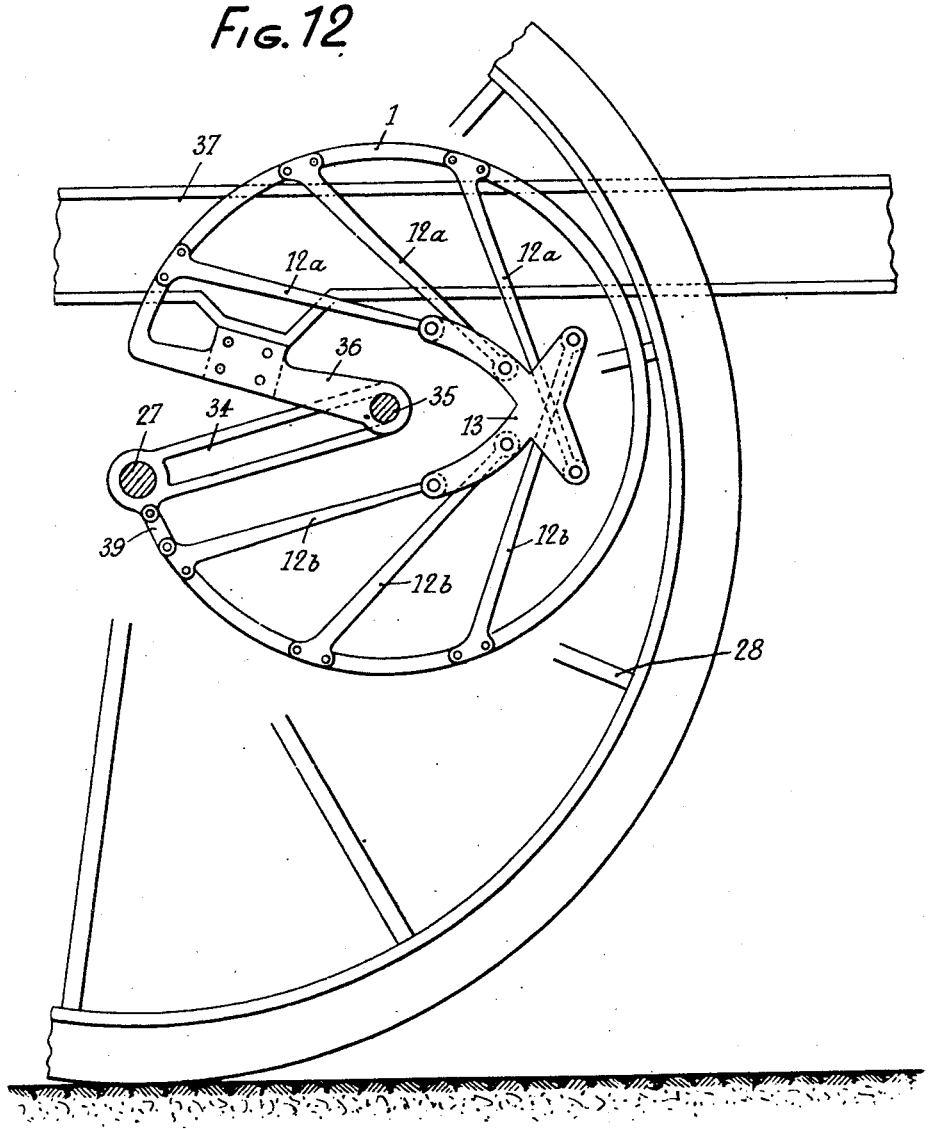

Aug. 22, 1950     R. SAULNIER     2,520,017
SPRING SYSTEM

Filed Oct. 6, 1945     13 Sheets-Sheet 7

Inventor:-
Raymond Saulnier
By Brown & Orward
Attorneys

Aug. 22, 1950     R. SAULNIER     2,520,017
SPRING SYSTEM

Filed Oct. 6, 1945     13 Sheets-Sheet 8

Inventor:-
Raymond Saulnier
By Brown & Oward
Attorneys

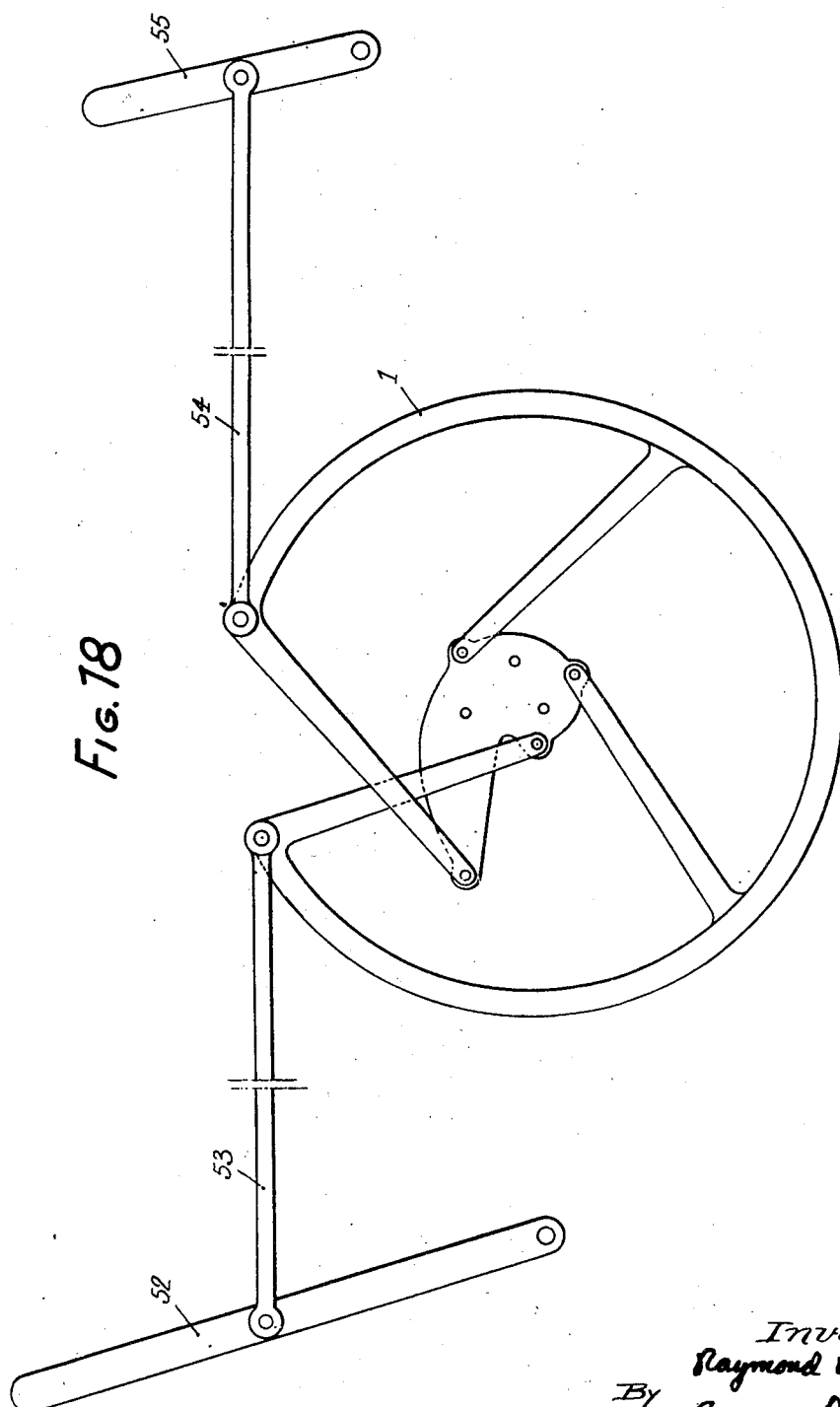

Aug. 22, 1950     R. SAULNIER     2,520,017
SPRING SYSTEM

Filed Oct. 6, 1945     13 Sheets-Sheet 10

Inventor:-
Raymond Saulnier
By Brown & Seward
Attorneys

Aug. 22, 1950  R. SAULNIER  2,520,017
SPRING SYSTEM
Filed Oct. 6, 1945  13 Sheets-Sheet 11

Inventor:
Raymond Saulnier
By Brown & Coward
Attorneys

Aug. 22, 1950 R. SAULNIER 2,520,017
SPRING SYSTEM

Filed Oct. 6, 1945 13 Sheets-Sheet 12

Inventor:-
Raymond Saulnier
By Brown & Deward
Attorneys

Aug. 22, 1950     R. SAULNIER     2,520,017
SPRING SYSTEM
Filed Oct. 6, 1945     13 Sheets-Sheet 13
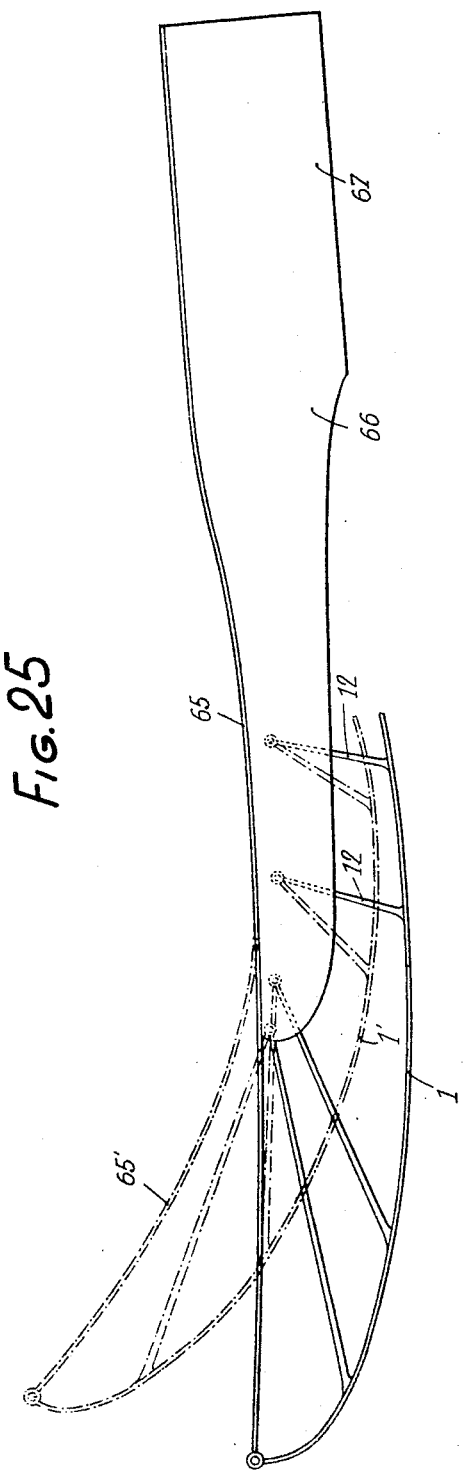
Inventor:-
Raymond Saulnier
By Brown & Coward
Attorneys

UNITED STATES PATENT OFFICE 2,520,017

SPRING SYSTEM

Raymond Saulnier, Paris, France

Application October 6, 1945, Serial No. 620,749
In France April 17, 1944

Section 1, Public Law 690, August 8, 1946
Patent expires April 17, 1964

7 Claims. (Cl. 267—1)

The present invention relates to devices including a flexible structure the deformations of which under the effect of the external forces are to be controlled. The invention is more especially, but not exclusively, concerned with devices of this kind (such as suspension springs, resilient wheels, transmissions, clutches, etc.) in which the structure in question is to keep always its circular shape in the course of these deformations, which are therefore reduced to variations of radius of the circle constituted by said structure.

It has already been proposed to obtain this result by a discontinuous construction of the structure in question the various elements of which, while being movable radially so as to permit the desired variations of its radius of curvature, can slide circumferentially with respect to one another in order to make allowance for the corresponding variations of length of the structure. Such devices are complicated and are lacking in resiliency. Furthermore, due to the discontinuity of their peripheral surface, they cannot be employed in many applications.

It has been endeavoured to obviate these drawbacks by constituting the structure in question in the form of an element continuous and extensible in the tangential direction. But such devices do not constitute true solutions of the problem above set forth, because their periphery does not present, at every point thereof, the desired resistance and continuous curvature.

The present invention has for its object to give an accurate solution of the above problem. It consists essentially in constituting the structure in question by a non-extensible flexible, self-sustaining blade or band, curved to the desired shape, and carrying, rigidly fixed at a plurality of points thereof, arms connected, for instance by pivoting at suitable points, to a common central piece, the disposition and the dimensions of these various elements being chosen in such manner that the deformations of the structure under the action of the external forces to which it is subjected are fixed by a predetermined law.

As above stated, the invention, in one form thereof, has for its object to ensure that a flexible band wound into a circle is kept in this circular form in the course of the deformations it undergoes.

In this case, the desired result can be obtained, for a given range of deformations chosen within suitable limits, by pivoting the above mentioned arms to the common central piece at respective points located, on this piece, along a hyperbolic spiral such that its parameter, that is to say the distance between its pole and its asymptote, is equal to the radius of the circle formed by the band in its mean position, said arms, in the mean position of the system, being tangent to the spiral in question.

In such devices, the flexible band, in the course of its deformations, always has its center located at the same point of the central piece, to wit the pole of the hyberbolic spiral traced thereon. This property permits many different arrangements of the piece and the band with respect to each other. It permits, in particular, of pivoting the central piece about the center of the structure constituted by the flexible band, for instance, in the case of a flexible wheel, about the axle of this wheel. It also permits of making use of several central pieces associated with the same flexible band, the points utilized on each piece being only those corresponding to an interesting portion of the hyperbolic spiral. In this case, the various central pieces associated together must in general be pivotally mounted with respect to one another about an axis passing through the poles of their respective spirals. However it is possible, according to a particular embodiment of the invention, to make use of a double central piece the two elements of which are fixed with respect to each other, provided that the two hyperbolic spirals traced on these respective elements have the same pole and the same asymptote, but are wound in opposed directions, that is to say are symmetrical of each other with respect to their common polar axis.

The particular embodiment of the invention according to which the flexible band is caused always to keep a circular form gives considerable advantages in a very great number of applications.

In the construction of resilient wheels for vehicles, it permits of absorbing the load by means of a single spring.

In the application to springs, in particular, it permits of substantially reducing the overall dimensions of the system, and, owing to the uniform curvature of the band over its whole length for all service loads, it ensures uniformity of fatigue of the band over its whole length.

On the other hand, it will be readily understood that the construction of brake drums, clutch elements, electric contactors, expansible pulleys, and analogous parts for which it is necessary to keep a strictly circular shape, will be made particularly simple and efficient when applying the above stated principle, according to the invention.

The same applies to the guiding of springs of circular shape in order to obtain, for a given variation of radius, a given displacement of one end thereof.

It should be well understood that if, in many cases, the arms above mentioned must be as rigid as possible, this is not an absolutely necessary condition according to the invention. In particular, the latter includes the case in which the arms are fixed in a rigid way at one end of the flexible band and at the other end to the common central piece, which of course implies that these arms must then be flexible.

Other features and advantages of the invention will appear in the course of the following description, with reference to the annexed drawings, of various embodiments of the invention, given by way of example.

On these drawings:

Figs. 3, 4 and 5 show, in a similar way, modifications of the embodiment of Fig. 2;

Figs. 6, 7 and 8 illustrate the application of the invention to the construction of suspension springs;

Fig. 9 shows a suspension for a bicycle trailer made according to an embodiment of the invention;

Figs. 10, 11 and 12 are partial views relating to modifications of vehicle suspensions made according to the invention;

Fig. 18 shows a motion reducing link mechanism according to the invention;

Figs. 1 to 24 inclusive relate to the particular form of the invention according to which a flexible deformable band must be compelled always to keep a circular shape.

The invention is, in this case, based upon the characteristic property of hyperbolic spirals, to wit the constant length of the circular arc subtended between said spiral and its polar axis, in combination with the property of circles according to which the radius makes a constant angle with the circumference.

The consequence of the first property is that, being given a certain number of spirals having the same pole and the same polar axis, all the circular arcs that have their center at this pole and are limited by two of these spirals are of the same length.

It follows that, if a certain number of points, sufficiently close to one another, of an elastic band are guided in such manner as to be able to move freely along respective hyperbolic spirals, having all the same pole and the same polar axis, and if, on the other hand, the band, at these points, is compelled to remain always perpendicular to the corresponding radii traced from the common pole of all the spirals, this band, when subjected to the action of external forces, will deform concentrically to itself, while turning, differentially along its circumference, about the pole, until, due to its new curvature and to the resulting internal strain, it finds a new state of equilibrium, while still preserving its circular shape.

The invention therefore consists, in the form of the invention that is being considered, in providing, in combination, means for guiding a certain number of points of the band along hyperbolic spirals having all the same pole and the same polar axis and means for compelling the normals to the band at these various points to pass always through said pole.

Figure 1:
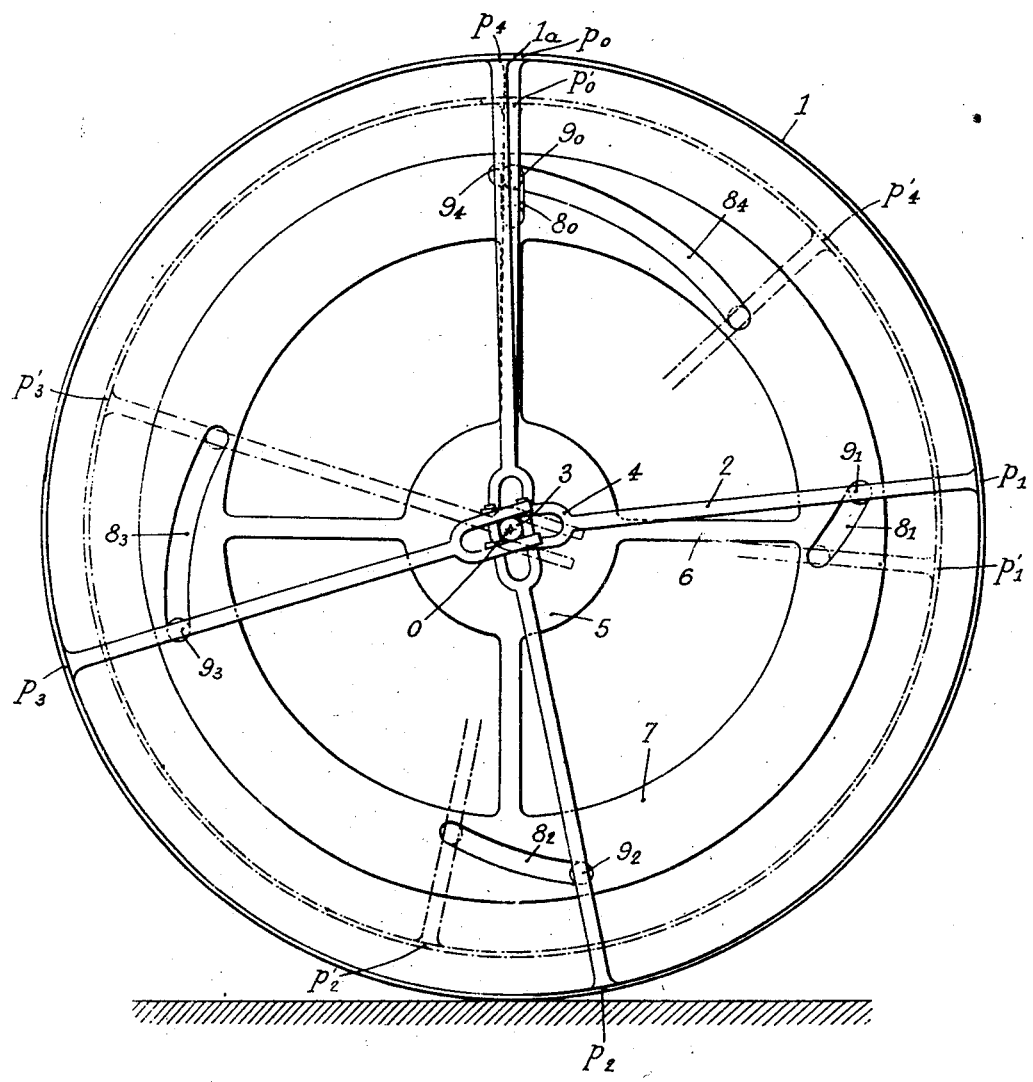
Fig. 1 is a diagrammatic elevational view of a first embodiment of the invention, adapted to be applied to the construction of a resilient wheel.

Fig. 1 shows a rigorously accurate application of this principle, while Figs. 2 to 22 inclusive relate to solutions that are approximate, but sufficiently accurate for practical purposes.

In the embodiment of Fig. 1, 1 is the flexible band wound in the form of a circle and the ends of which overlap at $1a$. The above mentioned points of this band are: $p_0$, $p_1$, $p_2$, $p_3$, $p_4$.

Point $p_0$ is to be guided along a hyperbolic spiral which coincides with the polar axis passing through the center 0 of the circle and through said point $p_0$.

Point $p_1$ must move along a hyperbolic spiral the pole of which is 0 and the polar axis $0p_0$. Therefore the equation of this hyperbolic spiral is:

$$\rho = \frac{a_1}{\omega}$$

in which $a_1$ is equal to the length of arc $p_0p_1$ (parameter), $\rho$ represents the polar axis $0p_0$ and $\omega$ is the angle $p_0$—0—$p_1$.

Point $p_2$ must be guided along a hyperbolic spiral the pole of which 0 and the polar axis $0p_0$ and the equation of which is:

$$\rho = \frac{a_2}{\omega}$$

in which $a_2$ is equal to the length of arc $p_0p_2$.

Likewise, points $p_3$ and $p_4$ must be guided along hyperbolic spirals both having as pole 0 and as polar axis $0p_0$, and the respective equations of which are:

$$\rho = \frac{a_3}{\omega}$$

and $$\rho = \frac{a_4}{\omega}$$

$a_3$ and $a_4$ being respectively equal to the lengths of arcs $p_0p_3$ and $p_0p_4$.

In the embodiment of Fig. 1, which will be supposed to represent a resilient wheel, the guiding means in question are constituted as follows: band 1 carries, fixed thereto, at each of the points $p_0$, $p_1$, $p_2$, $p_3$, $p_4$, an arm 2 provided at its end with a fork 4 adapted to slide on the axle 3 of the wheel. This axle carries a hub 5 which constitutes the common central piece and is free to rotate about the axle. This hub is connected through radial arms 6 with an annular part 7. Each of the arms 2 carries a pin, respectively $9_0$, $9_1$, $9_2$, $9_3$, $9_4$, located at a distance from the corresponding point $p_0$, $p_1$, $p_2$, $p_3$, $p_4$ equal to a length $b$. The annular part 7 of the hub is provided with slots $s_1, s_2, s_3, s_4$ the shape of which corresponds to the following equations (slot $s_0$ being rectilinear and extending along the polar axis $Op_0$):

$$\text{for } s_1 \quad r = \frac{a_1}{\omega} - b$$

$$\text{for } s_2 \quad r = \frac{a_2}{\omega} - b$$

$$\text{for } s_3 \quad r = \frac{a_3}{\omega} - b$$

$$\text{for } s_4 \quad r = \frac{a_4}{\omega} - b$$

It will be seen that, owing to this guiding, the corresponding points $p_0, p_1, p_2, p_3, p_4$ are truly compelled to move, under the effect of the load, along the above mentioned hyperbolic spirals.

Furthermore, due to the fact that arms 2 have been built perpendicular to band 1 at their respective points of fixation, they constitute the second means above mentioned, to wit those which compel the normals to the bands at the various points that are considered to pass always through center 0.

I have therefore truly provided a device complying in a rigorous manner with the conditions above set forth. Under these conditions, band 1 will always keep its circular shape in the course of its deformations, as shown in dotted lines on the drawing. In the course of the deformation that brings each of the points $p_0, p_1, p_2, p_3, p_4$ into positions $p'_0, p'_1, p'_2, p'_3, p'_4$, each point of the band turns, with respect to center 0, through an angle which is the greater as the point in question is more remote on the circumference from point $p_0$.

In order to obtain a device of simpler construction and safer operation, it suffices to comply with the conditions above set forth with a certain approximation.

Figure 2:
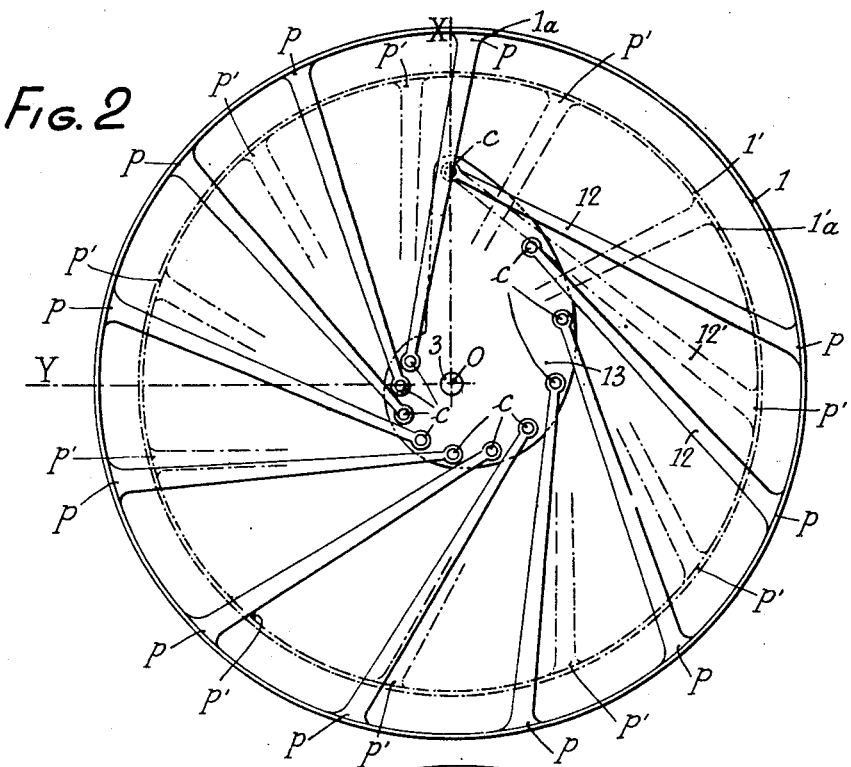
Fig. 2 is a similar view of another embodiment.

An example of such a device is shown on Fig. 2, which is a diagrammatical elevational view of a resilient wheel made according to the invention.

In this case, in order to obtain the guiding of the various points $p$ of the band 1 along the desired hyperbolic spirals, all having 0 as pole and $OX$ as polar axis, it is considered that the portions of these spirals effectively described by these points may coincide with circular arcs of suitably chosen centers. According to the embodiment of the invention shown by Fig. 2, these centers are distributed, on a piece 13 carried by the axle 3 of the wheel, along a hyperbolic spiral the pole of which is 0, the axis of which is $OY$, perpendicular to $OX$, and the parameter of which is equal to the radius of the circle formed by band 1 in its mean position. On the other hand, in order to cause the various points $p$ to describe these circular arcs, use is made of arms 12 fixed in band 1, the angles of fixation being such that, in the means position of the system, these arms are tangent to the hyperbolic spiral the pole of which is 0 and the polar axis $OY$, at the points thereof where said arms are pivoted to piece 13.

I have ascertained that, under these conditions, not only do the various points $p$ of the band describe circular arcs which, within the limits of deformation that are considered, may be considered as coinciding with portions of spirals having 0 as pole and $OX$ as polar axis, but also the fixation of the various arms 12 in band 1 compels the normals to said band at points $p$ to pass all through point 0, at least with an approximation sufficient for practical purposes.

It is therefore clear that the device diagrammatically shown by Fig. 2, due to the fact that it practically complies with the conditions above set forth, preserves the circular shape of band 1 in the course of the deformations thereof under the effect of variations of the external forces that are applied thereto. If, for instance, the wheel of Fig. 2 undergoes an increase of load, the arms 12 pivot about their respective points $c$ and their ends $p$ move to $p'$, the whole taking the position shown in dotted lines, which corresponds to a reduction of the diameter of the wheel, the rim of which passes from position 1 to position 1'. The front end of the elastic band turns along the circumference of the circle, from position $1a$ to position $1'a$, and all the other points of said band also turn about center 0 through different angles, smaller and smaller as one gets farther from point $1a$ along the circumference in the counterclockwise direction, as shown by Fig. 2, that is to say as the corresponding arms 12 pivot on central piece 13 at points farther and farther from pole 0.

An important property of the device which has just been described lies in the fact that, in the course of its deformations, circle 1 always has its center coinciding with the pole 0 of the spiral, traced on piece 13, along which are located the pivot points $c$ of arms 12.

In the case of Fig. 2, it is supposed that the central piece 13 (hub of the wheel) which carries the pivot axes $c$ of arms 12 is fixed with respect to axis 0. However, it is possible to provide other arrangements. Furthermore, instead of making use of only one central piece, it may be advantageous in many cases, to provide two or several pieces arranged in such manner as to cooperate with the same flexible band.

Figure 3:
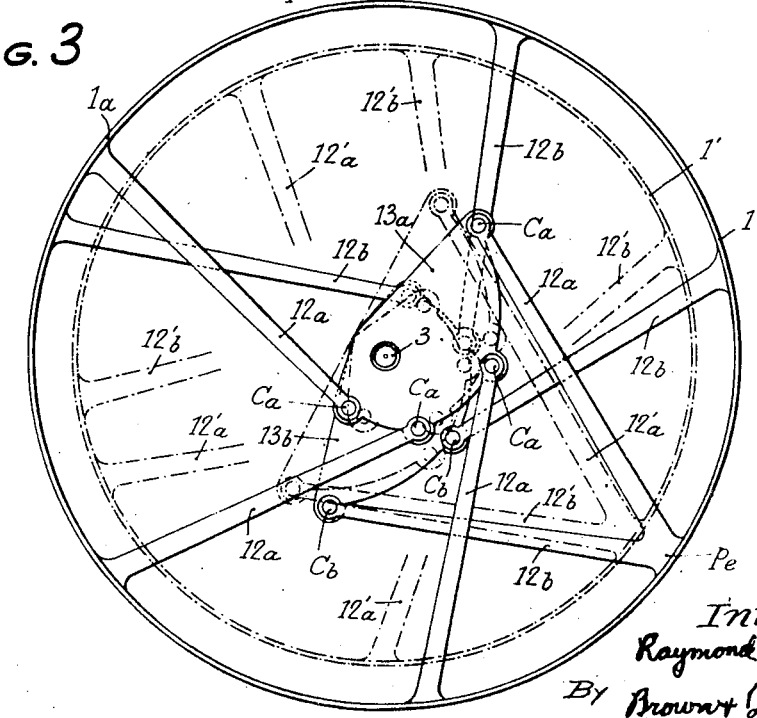

Fig. 3 shows an embodiment in which the axis 3 carries, pivoted thereon, two central pieces $13a$ and $13b$ on the periphery of which are pivoted arms $12a$ and $12b$ fixed in the metallic band 1. One of the arms $12a$ and one of the arms $12b$ are joined to each other at their point of fixation $p_e$ to the band 1. With this arrangement, under the effect of any cause tending to deform the wheel, the arms $12a$ and $12b$ turn about their respective pivot axes $c_a$ and $c_b$ at the same time as the pieces $13a$ and $13b$ turn with respect to each other about the axle 3 of the wheel. Under the effect, for instance, of an increase of the load, band 1 comes into position 1', while the various arms assume positions $12'a$ and $12'b$.

As a rule, as shown by the example of Fig. 3 when several central pieces are used, they must be free to turn with respect to one another about the axis of axle 3.

However, it is possible, in some cases, to make use of two central pieces fixed with respect to each other, which cooperate, through their respective arms, with the same flexible band. An example of such a construction is shown on Fig. 4. In this case, the hyperbolic spirals traced on the common central piece $13c$, along which are located the pivot axes $c_a$ and $c_b$ of the arms 12 must be two spirals identical and symmetrical to each other, with respect to their common polar axis. The band 1, instead of winding or unwinding from the overlap point $1a$, winds or unwinds symmetrically from a point $1b$ diametrically opposed to point $1a$. In Fig. 4, as in the other figures, is shown in dot-and-dash lines the position of the wheel under the effect of an increase of the load or of a shock on the ground.

Fig. 5 shows a particular embodiment of the arrangement of Fig. 4. In this case, only two points on each hyperbolic spiral are taken as pivot axes of arms 12. One of these points 14 is the point of intersection of the two spirals, the two other points 15a and 15b being any two points symmetrical to each other on the two respective spirals. In keeping strictly to the arrangement shown by Fig. 4, the arms 12a and 12b corresponding to pivot points 15a and 15b would extend directly between these points 15a and 15b and the corresponding points $p_a$ and $p_b$ of the band 1. In order to ensure perfect correspondence of the displacements of the ends of said band 1 which come to join with each other at 1a, the lower arms 12a and 12b are given an angular shape, the apexes of their right angles being joined by a connection which permits displacement of the whole. For instance, as shown by Fig. 5, arm 12a is provided with a slot 17 and arm 12b with a finger or pin 17a engaged in this slot 17. Thus, the parts of band 1 to which lead the arms 12a and 12b in question are always kept in coincidence with each other, that is to say the circle formed by the band 1 always closes exactly upon itself.

Up to now, it has been supposed that the devices described with reference to the drawings were wheels. It should be well understood that the invention is not in any way limited to the construction of resilient wheels and that it covers, in a general way, any device including a flexible blade or band adapted to be more or less curved, while keeping always the shape of a circle or of a circular arc (the expression "circular arc" applying to the case of an angle greater than 360° as well as to that of an angle smaller than this value).

The invention is particularly applicable to the case of the flexible band above mentioned constituting a spring. As a matter of fact, it will be understood that if a spring band is caused to remain constantly wound in the form of a circle, supposing, of course, that the thickness of this band is uniform, the fatigue will be the same at all the points thereof and the efficiency of such a band will be maximum. Furthermore, for a given length of band, the winding thereof in the form of a circle or a circular arc permits of considerably reducing the space occupied, which is particularly interesting in the case of a vehicle suspension.

Fig. 6 gives an example of utilization of a spring according to the invention for the suspension of an axle, such as 3, with respect to a fixed part 16. In this case, the band 1 is secured in its middle portion, to the fixed part 16, while four points of this band are connected through arms 12 to a double central piece 13c of the type shown in particular on Figs. 4 and 5 above described, and which carries the axle 3 centered on the pole of the hyperbolic spirals materialized in this piece. In this way, the axle 3 is suspended in a position of equilibrium depending upon the combined actions of the load supported by the axle 3 and the resiliency of band 1. Within the permitted limits of displacement, any vertical displacement of axle 3 will correspond to an elastic deformation of band 1, but the latter will always remain wound in the form of a circle.

In the embodiment of Fig. 7, the band 1 that acts as spring is compelled to keep its circular form due to the fact that six of its points are connected through arms 12 fixed therein to suitably chosen pivot points, located, as above explained, on a fixed surface not shown on the drawing. In this case, it is supposed that the suspended point is point 18, chosen for instance at one end of the band 1. The displacements of this point 18, in the direction of the arrows, take place in such manner that band 1 always remains of circular shape. By taking any other point of band 1 or of one of the arms 12 as suspended point, it is possible to obtain a great number of different combinations, that is to say to vary at will the amplitude and the direction of the displacement of said suspended point.

Fig. 8 diagrammatically shows, by way of example, the construction of a structure of the type shown by Fig. 7, but in which the two upper arms 12 are dispensed with. As, in this case, the upper portion of band 1 (extending over nearly 180°) might undergo non-symmetrical deformations, the middle point 19 of this band caries an arm 20 adapted always to pass through the center of the circle; the lower end of arm 20 carrying for instance a fork that slides on the axis 3 of the structure.

Figs. 9, 10, 11 and 12 show the application of the device according to the invention to the suspension of a vehicle, constituted for instance by a bicycle trailer.

The embodiment of Fig. 9 includes a spring arrangement substantially of the type shown by Fig. 7. Spring 1 is fixed to the body of the vehicle through arms 12 pivoting about points distributed on the periphery of a central piece 13 fixed to said body, and the suspended part, that is to say the stub axle 27 of the wheel, is mounted on one of the ends of band 1. The suspension of Fig. 9 is constituted by a system (including spring 1, with its arms 12 and central piece 13) adapted to be fitted at will on any vehicle body. For this purpose, central piece 13 is constituted by a plate provided with a certain number of holes 30 by means of which it can be fixed in any desired position on a vehicle body. With a suitable choice of the position and direction of plate 13 with respect to the body, it is possible to obtain any desired amplitude and trajectory of the displacements of stub axle 27.

Fig. 10 shows a vehicle suspension of the same type as that of Fig. 9, but corresponding to a different geometrical conception of the problem. In the embodiment of Fig. 10, a point 31 of band 1 is fixed to the body 21 which carries the pivots of arms 32. Now, the above explanations, together with Fig. 9, show that all the points of band 1 must, in the course of the deformations thereof, move with respect to the central piece. If, therefore, point 31 is fixed to the body, then the central piece should move with respect to the body so that its pole, located at 0 for the position in solid lines, comes into $0_1$ for the position in dotted lines, that is to say remains always at the center of the circle formed by band 1. However, if it is supposed that the amplitude of deformation of band 1 is relatively small, it may be sufficient to pivot arms 32 directly to body 21 and thus still to obtain a satisfactory solution. Of course, in this case, the points where arms 32 are pivoted to the body and no longer located on a hyperbolic spiral traced on the body 21.

According to the embodiment of Fig. 11, the body 21 of the trailer carries, fixed thereon as by bolts 24', the lower end of a rectilinear spring band 24, which is prolonged by a portion 25 of circular shape. The portion 25 of the spring carries, fixed therein at different points of its circumference, arms 12 pivoted to central piece 13 at respective points of the periphery thereof, which is in the form of a hyperbolic spiral. Piece 13 pivots at 22, about the pole of this spiral, with respect to the body 21 of the vehicle and is rigid with an arm 26 the end of which carries the axle 27 of wheel 28.

When, under the effect of a shock for instance, axle 27 tends to move upwardly with respect to body 21, the arm 26 which carries this axle pivots in the clockwise direction about axis 22, fixed with respect to the body. Central piece 13, which is rigid with arm 26, therefore turns also about the pole of the spiral formed by its outline. It follows that the various points $p$ of fixation of arms 12 in the portion 25 of the spring are drawn toward the center, and owing to the construction the principle of which has been above set forth, this portion 25 is deformed while remaining circular. The last point $p$ on the left of the drawing, that is to say where portion 25 is joined to portion 24, can undergo the desired displacement owing to the bending of the branch 24 of the spring.

In the embodiment of Fig. 12, 1 is the flexible band acting as a spring, 27 the stub axle of the wheel 28 of a vehicle, 34 a lever carrying said stub axle and hinged at 35 to an arm 36 rigidly fixed to the frame 37 of the vehicle, the axis about which arms 34 and 36 are pivoted to each other being located substantially at the center of the circle constituted by spring 1 in the mean position thereof. Arms 12a and 12b, fixed with respect to band 1, are carried by a double central piece 13, which is supported only by arms 12a and 12b and consequently floats with respect to the remainder of the device. Finally, in order to permit the working of the device, the stub axle 27 of the wheel is connected to the end of circle 1 through a shackle 39. This embodiment shows still another modification with respect to those above described and in which the central piece has been shown mounted in fixed position on the body of the vehicle (Fig. 9), then pivotally mounted on said body about the pole of the spiral (Fig. 11). This time, the central piece is wholly free with respect to the vehicle and is connected thereto only through the intermediate of arms 12a and 12b and of band 1, one end of which is connected through arm 36 to the frame of said vehicle.

Figure 13:
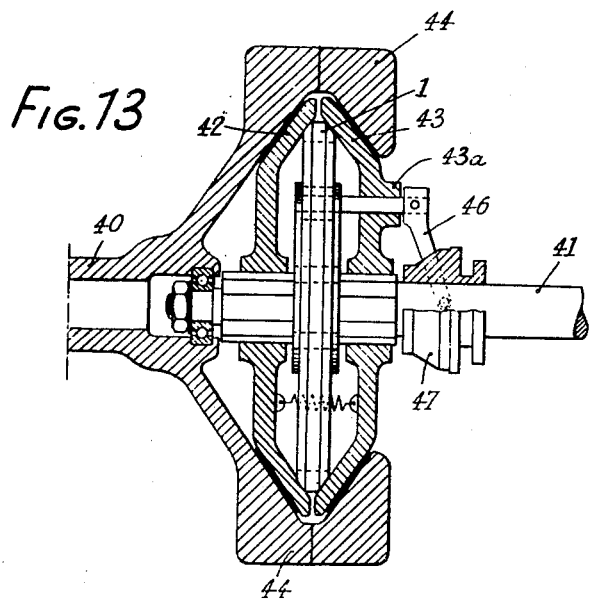
Figs. 13, 14 and 15 are, respectively, a sectional view, a part elevational view, and a part sectional view on an enlarged scale, of an embodiment of the invention as applied to the construction of a clutch.
Figure 14:
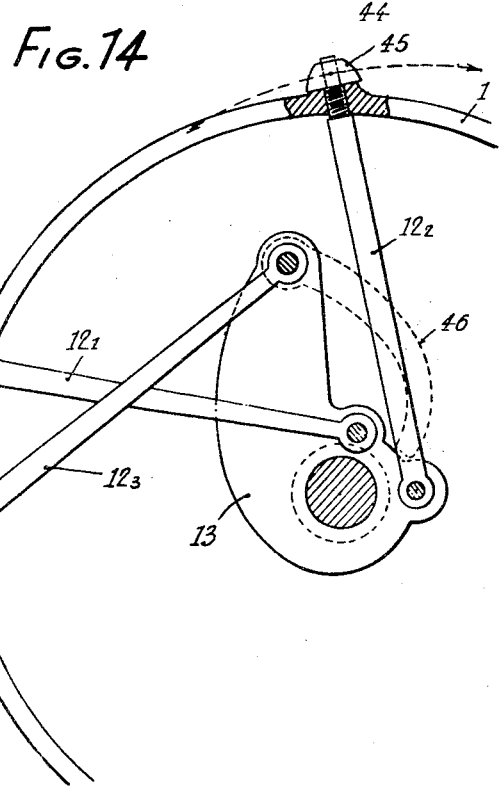
Figure 15:
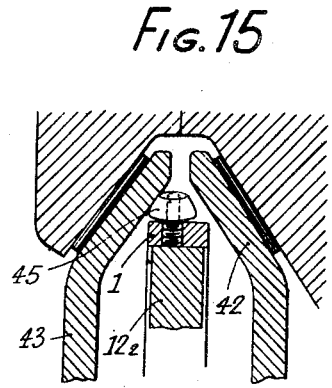

Figs. 13, 14 and 15 give an example of the application of the principle of deformation of a flexible band according to the invention to the construction of a clutch. This clutch is intended to couple at will a driving shaft 40 with a driven shaft 41. For this purpose, shaft 41 carries slidable thereon, two frusto-conical elements 42 and 43 adapted to be applied against the inner wall of a hollow body 44 of corresponding shape carried by shaft 40. The principle of such clutches is well known and it suffices to move elements 42 and 43 away from each other for bringing them into contact with element 44 with a view to ensuring the drive of shaft 41 by shaft 40. For this purpose, according to the invention, elements 42 and 43 are subjected to the action of a circular spring band 1 of variable diameter provided inside the space between pieces 42 and 43 and the periphery of which comes to bear against the inner walls of said elements 42 and 43.

When the diameter of circle 1 is increased, the latter, acting obliquely on elements 42 and 43, wedges them away from each other and brings them into contact with part 44.

In order to obtain the desired expansion and retraction of the band 1 while always maintaining its circular shape, use is made of the principle applied in the above described embodiments of the invention and which consists in securing to spring band 1 several arms such as $12_1$, $12_2$, and $12_3$, the inner ends of which are pivoted about points of the periphery (in the form of a hyperbolic spiral) of a central piece 13 (Fig. 14), the pole of this spiral being on the axis of shaft 41 and said piece being free to rotate on this shaft.

In order to control the deformation of band 1, one of the arms 12 rigid with this band (arm $12_3$ in the embodiment illustrated) carries a lever 46 pivoting in a boss 43a of element 43 and the rotation of which is produced, in a known manner, by the sliding displacement, on shaft 41, of a conical ring 47.

The explanations relating to the above described embodiments have shown that, when one of the arms 12 is pivoted with respect to the central piece, there is obtained, according to the direction of rotation, an increase or a reduction of the circle diameter. Consequently, the rotation of arm $12_3$ in the desired direction, caused by the rotation of lever 46, rigid with this arm, moves pieces 42 and 43 away from each other and brings them into contact with part 44, which couples the driven shaft 41 with the driving shaft 40.

In order to avoid wedging of the band 1 between the inner walls of pieces 42 and 43, the band may be provided with rollers 45 located alternately on one side and the other of the middle plane of band 1 so that a part of these rollers bear upon piece 42 and the others on piece 43. Preferably, rollers 45 are fixed to band 1 at the ends of arms 12, that is to say where these arms are fixed to band 1.

Figure 16:
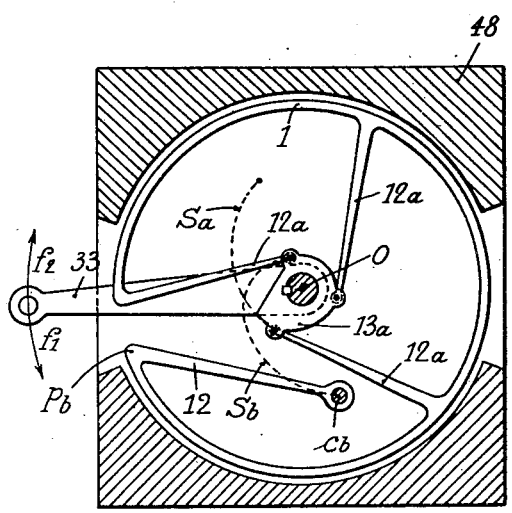
Fig. 16 shows an electric contactor according to the invention.

The embodiment of Fig. 16 shows the application of the invention to the construction of an electric contactor. In this case it is desired to obtain, between two metallic parts, an instantaneous contact along a surface as great as possible. The invention permits of obtaining this result by increasing the diameter of a circular band 1 located inside a casing 48 which constitutes one of the elements of the contactor, the other element being constituted by the band 1 itself. The guiding of this band is obtained by means of two common central pieces, one of which, 13a, carries three pivoting arms 12a, fixed in band 1. The other piece is not shown because it is reduced to a single point $c_b$ on which is pivoted the arm 12 fixed in band 1. This point is located on a spiral $S_b$, symmetrical with reference to a line $OP_b$ of the spiral $S_a$ formed by the extension of the curve of piece 13a. This arrangement is of the type above described with reference to Fig. 3, in which central piece 13b would be fixed with reference to the axis of central piece 13a and would be reduced to a single point $c_b$. The movement of piece 13a is imparted thereto by a lever 33 fixed thereto and the rotation of which in the direction of arrow $f_1$ produces contact, while, in the direction of arrow $f_2$, it breaks it. The switch might as well be controlled by acting on the system through any of the arms 12a and 12b.

Figure 17:
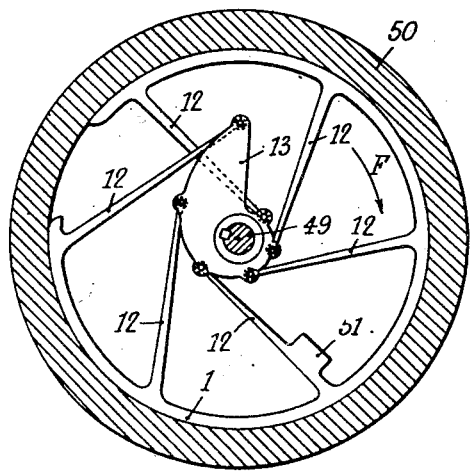
Fig. 17 is a diagrammatical view of free-wheel device made according to the invention.

Fig. 17 shows how the principle of the invention can be applied to the construction of a freewheel device. The part rigid with hub 49 includes a central piece 13, arms 12 pivoted to this piece and a circular band 1 to which these arms are secured. This band 1 is intended to cooperate with an annular member or ring 50 forming, for instance, the driving part of the freewheel, so that band 1 and ring 50 are wedged with respect to each other for one relative direction of rotation, whereas, for the opposite direction, they must be able to slide with respect to each other. Now, when the inner part rigid with hub 49 turns, in the direction of arrow F, at a speed higher than that of ring 50, the reaction imparts to band 1 a tendency to have its diameter reduced, whereby the system in question can turn freely with respect to ring 50. On the contrary, when said system is subjected to a resisting torque, that is to say a torque in the direction opposed to arrow F, band 1 is caused, by friction, to turn in a direction which tends to increase its diameter, so that it is wedged against ring 50 and the latter therefore drives hub 49. Part 51 is a balancing mass.

Fig. 18 shows an example of another application of the invention, to wit the construction of a motion reducing link mechanism. This device includes a lever 52 for operating a rod 53 hinged to one end of a circular band 1 of variable diameter, made according to the invention (and corresponding in particular to the embodiment illustrated by Fig. 2). The other end of said band carries, hinged thereto, a bar 54 pivoted to the lever 55 which receives the reduced speed movement. The operation of this device results clearly from the above given explanations.

Figure 20:
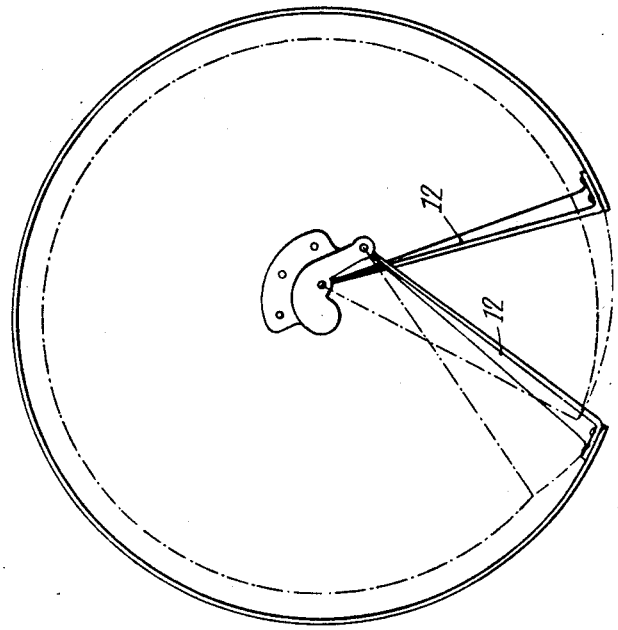
Figs. 19 and 20 are views illustrating means for guiding the deformation of circular springs according to the invention.
Figure 19:
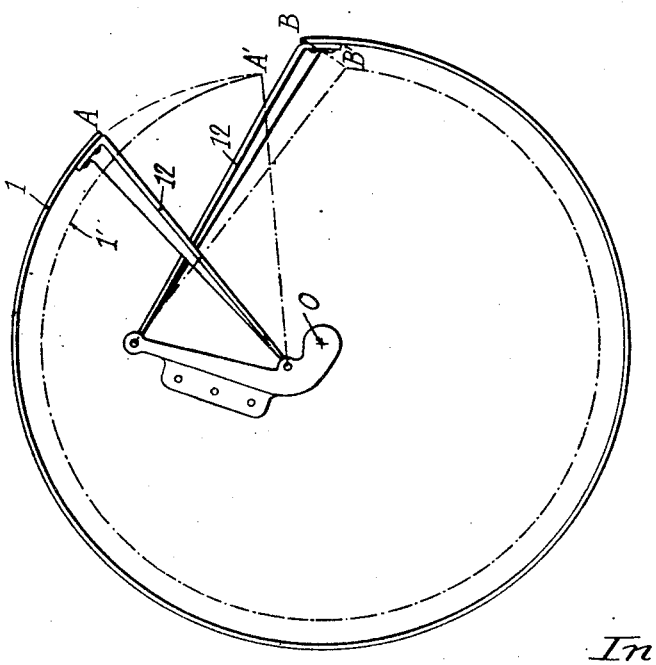

Figs. 19 and 20 are diagrammatical views showing two circular springs guided according to the principle of the invention, and arranged in such manner that, for a given variation of the radius, the displacement of the end of the spring that is acted upon has a given value, this value differing according to which end of the spring is acted upon. Fig. 19 shows, in fact, that in order to obtain a radius variation corresponding to the radial distance between the full line 1 and the dotted line 1', it is necessary to impart to end A an angular displacement AA' much greater than that to be imparted to end B. The same is true for Fig. 20.

As a matter of fact, and as it had already been shown by Fig. 2, the value of this displacement is the greater as the arm 12 carried by the end in question of the spring is fixed to a point of the spiral nearer to the pole thereof. Fig. 19 clearly shows that the angular displacement of end A, which corresponds to a point of the spiral close to the pole 0 thereof is much greater than the angular displacement of point B, fixed to an arm 12 connected to a point of the spiral much more distant from 0.

The embodiment of Fig. 20 gives analogous results for a different angular disposition of the central piece, that is to say for different values of the distance of the pivot points of arm 12 to the pole of the spiral.

In the preceding embodiments, except however in that shown by Fig. 1, the device is essentially constituted by a flexible and resilient band provided with arms secured in its periphery, these arms being pivoted, at suitable points, to a central piece. This arrangement may, in some cases, involve overall dimensions which are not acceptable.

Figure 22:
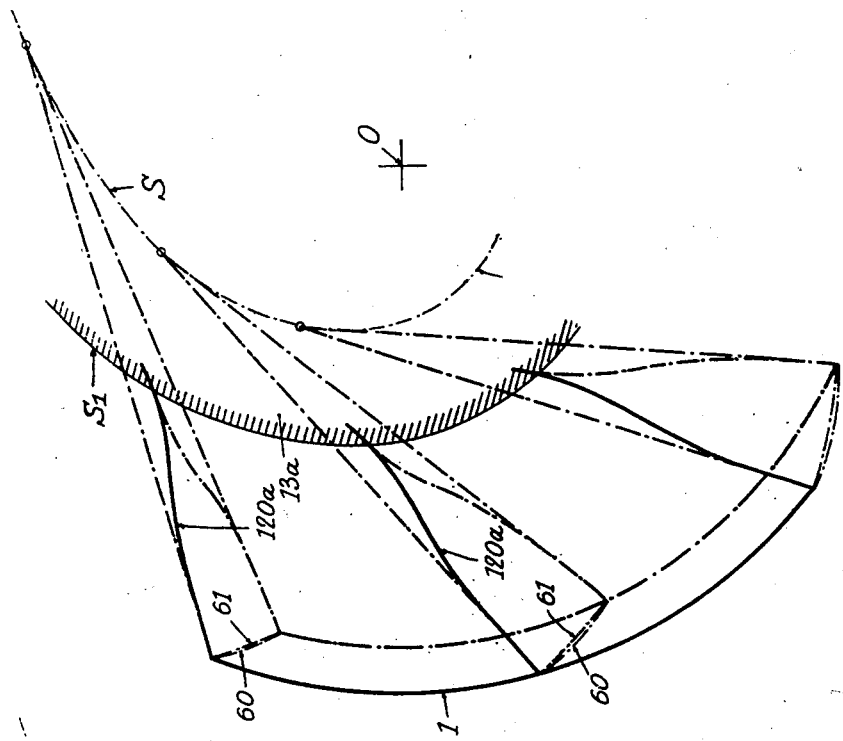
Figs. 21 and 22 are diagrammatical views relating to a particular embodiment of the invention intended to reduce the space occupied by the device.
Figure 21:
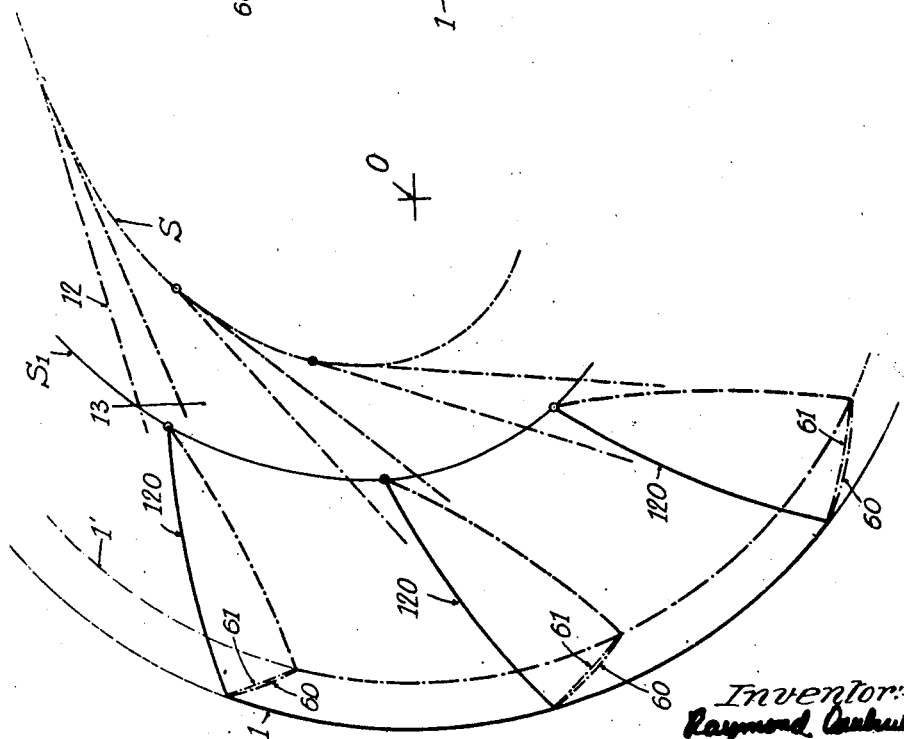

The embodiments shown by Figs. 21 and 22 have for their object, within the scope of the present invention, to obviate this drawback. They are based on the following remarks:

It will be supposed that, according to the above described solution, flexible band 1 has its deformation controlled by a certain number of arms shown in dotted lines at 12 and pivoted at different points of a central piece or spiral S (also shown in dotted lines). According to the embodiment of Fig. 21, there is traced a spiral S₁ parallel to S (that is to say constituted by the envelope of a family of circles all of the same radius and having their centers on S). Arms 12 are then replaced by arms 120 also secured in the elastic band 1, but hinged at various points of spirals S₁, and these arms 120 are given an elasticity sufficient for enabling them to be deformed so as to permit band 1 to come into position 1'. Fig. 21 shows that the radii of curvature of arms 120—supposed to be all of the same thickness—in the course of their various deformations, are the same for all of these arms, which indicates that they are working under identical conditions.

This Fig. 21 shows at 60 the arcs described by the ends of elastic arms 120 and at 61 the arcs they would describe according to the solutions of the preceding embodiments, that is to say if elastic band 1 was guided by rigid arms such as 12 pivoted at various points of spiral S. It is found that arcs 60 and 61 are very close to one another and can be considered as practically coinciding.

The construction shown by Fig. 22 is based upon the same principle as that of Fig. 21. But in this case the flexible arms 120, instead of being pivoted at various points of a spiral, such as S₁ traced on central piece 13a, are fixed in the periphery of said piece 13a, the outline of which corresponds to spiral S₁. Examination of the arcs 60 and 61 described by the ends of the arms 120a which are secured in band 1 shows that, with this arrangement, a sufficient approximation is also obtained. This form of the invention might, in particular, be well adapted to the construction of resilient wheel shoes.

Figure 23:
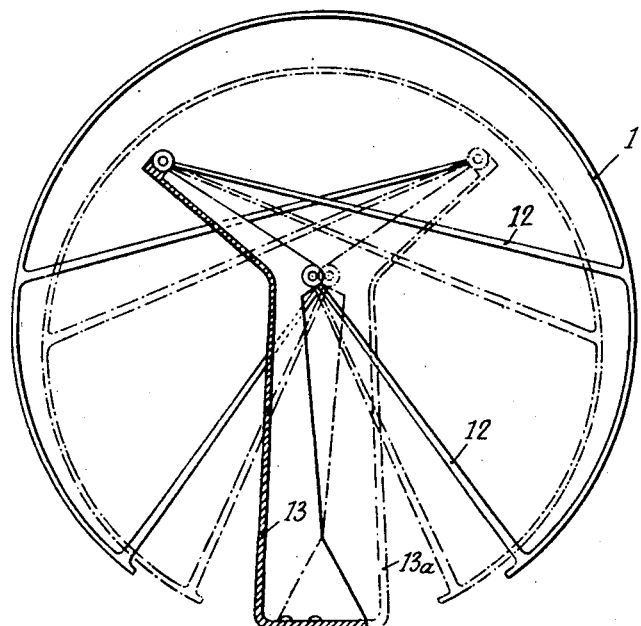
Figs. 23 and 24 are, respectively, a diagrammatical view in radial section, and a side elevational view, of an elastic tire made according to the principle of the invention.
Figure 24:
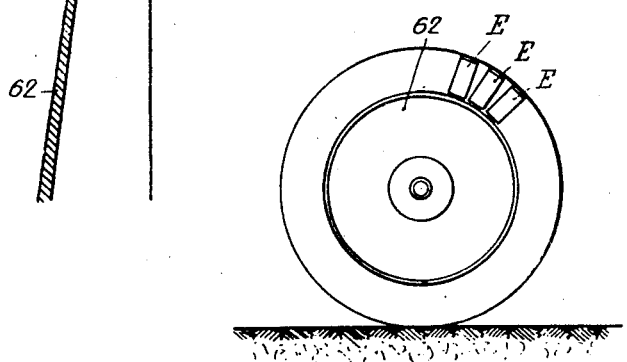

Figs. 23 and 24 show the application of the device according to the invention to the construction of a resilient tire for vehicle wheels.

In this construction, the tire is constituted by a series of elements such as E (Fig. 24) to be deformed transversely to the mean plane of the wheel. Fig. 23 shows how this deformation takes place. It will be seen that the resilient band 1 which forms an element of the tire, the section of which on a radial plane of the wheel is, in the state of rest, of substantially circular shape, is guided by arms 12 secured in its periphery and pivotally mounted on a support 13—13a carried by the web 62 of the wheel.

While I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. A device for controlling the deformations of a non-extensible flexible band adapted constantly to maintain said band in arcuate form, comprising a plurality of arms fixed to said band and pivoted to a common central piece at points located thereon along a hyperbolic spiral having a parameter equal to the radius of the circle formed by said band in its mean position, the angles of fixation of said arms to said band being such that said arms, in said mean position, are tangential to said spiral.

2. In combination with a support, a non-extensible flexible band wound in the form of a circle freely movable with respect to said support, a common central piece pivoted to said support about an axis perpendicular to the plane of said band, a plurality of arms carried by said band at different points thereof so as to make fixed angles therewith at said points, and means for pivoting said arms to said common central piece at respective points thereof located along a hyperbolic spiral formed on said piece in a plane parallel to that of said band and having its pole located on said axis and its parameter equal to the radius of the circle formed by said band in the mean position thereof, the angles of said arms with said band being such that said arms, in the mean position of said band, are tangent to said spiral, whereby, under the effect of the external forces acting thereon, said band remains wound in the form of a circle having its center at the pole of said spiral.

3. In combination with a support, a non-extensible flexible band wound in the form of a circle, a common central piece pivoted to said support about an axis perpendicular to the plane of said band, a plurality of arms carried by said band at different points thereof so as to make fixed angles therewith at said points, and means for pivoting said arms to said common central piece at respective points thereof located along a hyperbolic spiral formed on said piece in a plane parallel to that of said band and having its pole located on said axis and its parameter equal to the radius of the circle formed by said band in the mean position thereof, the angles of said arms with said band being such that said arms, in the mean position of said band, are tangent to said spiral, whereby, under the effect of the external forces acting thereon, said band remains wound in the form of a circle having its center at the pole of said spiral.

4. The combination of a non-extensible flexible band wound in the form of a circle, at least two central pieces pivoted to each other about an axis perpendicular to the plane of said band, a plurality of arms carried by said band at different points thereof so as to make fixed angles therewith at said points, means for pivoting some of said arms to one of said central pieces at respective points thereof located along a hyperbolic spiral formed on said piece in a plane parallel to that of said band and having its pole located on said axis and its parameter equal to the radius of the circle formed by said band in the mean position thereof, and means for pivoting the remainder of said arms to the other central piece at respective points thereof located along a hyperbolic spiral formed on said piece in a plane parallel to that of said band and having its pole located on said axis and the same parameter, the angles of said arms with said band being such that said arms, in the mean position of said band, are tangent to their spirals, respectively, whereby, under the effect of external forces acting thereon, said band remains wound in the form of a circle having its center at the pole of said spiral.

5. The combination of a non-extensible flexible band wound in the form of a circle, a common central piece, a plurality of arms carried by said band at different points thereof so as to make fixed angles therewith at said points, and means for pivoting some of said arms to said common central piece at respective points thereof located along a hyperbolic spiral formed on said piece in a plane parallel to that of said band and having its pole located on said axis and its parameter equal to the radius of the circle formed by said band in the mean position thereof, and means for pivoting the remainder of said arms to said piece at respective points thereof located along a hyperbolic spiral symmetrical of the first mentioned one with respect to the polar axis thereof, the angles of said arms with said band being such that said arms, in the mean position of said band, are tangent to their respective spirals whereby, under the effect of external forces acting thereon, said band remains wound in the form of a circle having the center at the pole of said spiral.

6. A resilient wheel which comprises, in combination, a non-extensible flexible rim wound in the form of a circle, a common hub piece, a plurality of arms carried by said rim at different points thereof so as to make fixed angles therewith at said points, means for pivoting said arms to said hub piece at respective points thereof located along a hyperbolic spiral formed thereon and having a parameter equal to the radius of the circle formed by said rim in the mean position thereof, the angles of said arms with said rim being such that said arms, in the mean position of said rim, are tangent to said spiral, and a wheel axle passing through the pole of said spiral.

7. A device of the character described which includes at least one non-extensible flexible arcuate part adapted to undergo variations of radius, comprising, a common central piece, a plurality of arms carried by said arcuate part at different points thereof so as to make fixed angles therewith at said points, and mechanical means for connecting said arms to said common central piece at respective points located thereon along a hyperbolic spiral having a parameter equal to the radius of the arc formed by the arcuate part in its mean position, the angles of fixation being such that said arms, in said mean position, are tangential to said spiral.

RAYMOND SAULNIER.

REFERENCES CITED

The following references are of record in the file of this patent:

UNITED STATES PATENTS

| Number | Name | Date |
| --- | --- | --- |
| 635,687 | Judge | Oct. 24, 1899 |
| 871,237 | Robinson | Nov. 19, 1907 |
| 915,470 | Owens | Mar. 16, 1909 |
| 1,066,267 | Gerleit | July 1, 1913 |
| 1,156,859 | Hamilton | Oct. 12, 1915 |
| 1,196,702 | Kogan | Aug. 29, 1916 |
| 1,512,820 | Critchlow | Oct. 21, 1924 |
| 1,776,261 | Kreissig | Sept. 23, 1930 |
| 1,917,373 | Jakobsen | July 11, 1933 |